Oct. 9, 1962 K. E. A. GÖTHBERG ETAL 3,057,667
CAGE FOR CYLINDRICAL ROLLER BEARINGS
Filed Feb. 25, 1960 3 Sheets-Sheet 3

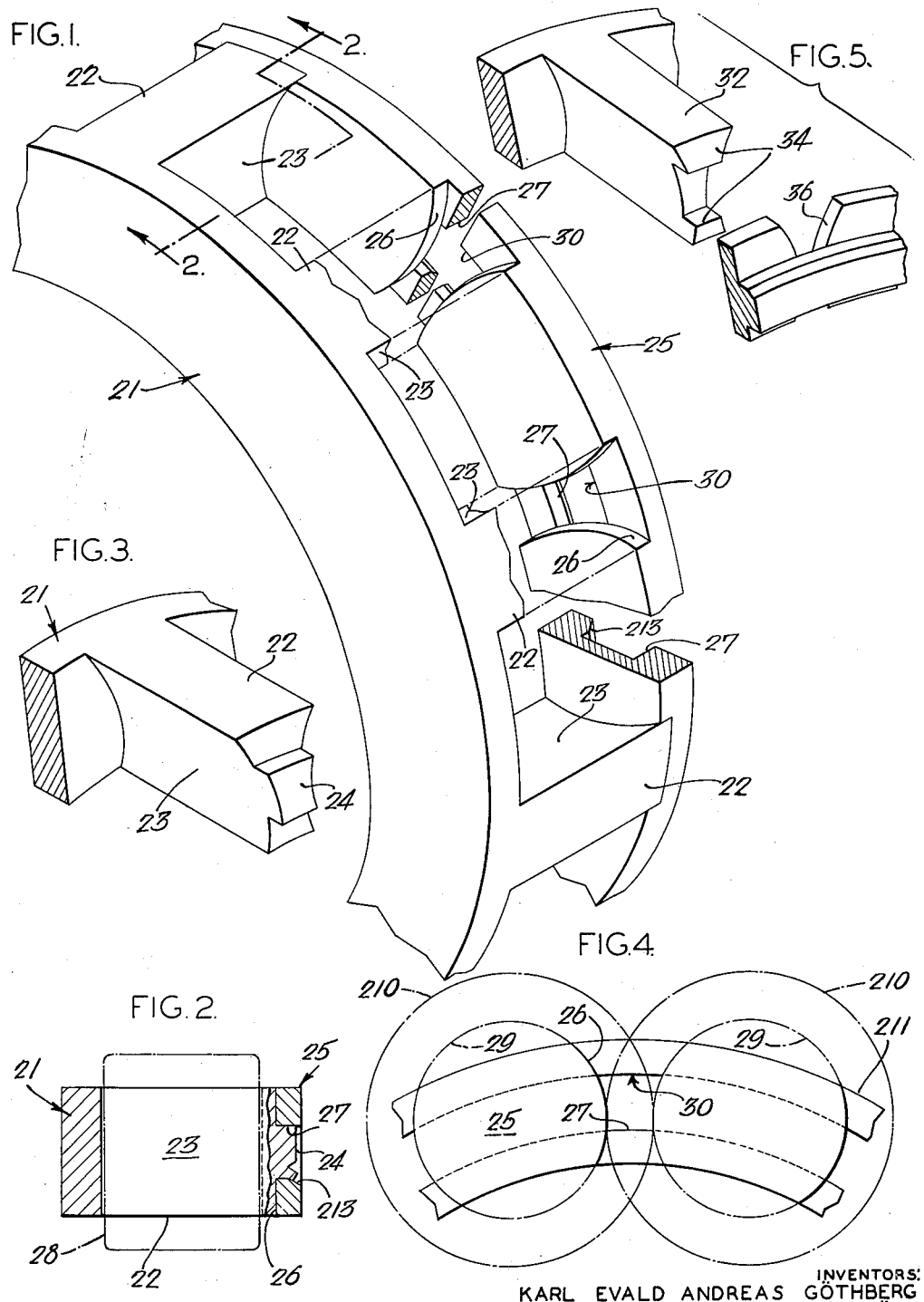

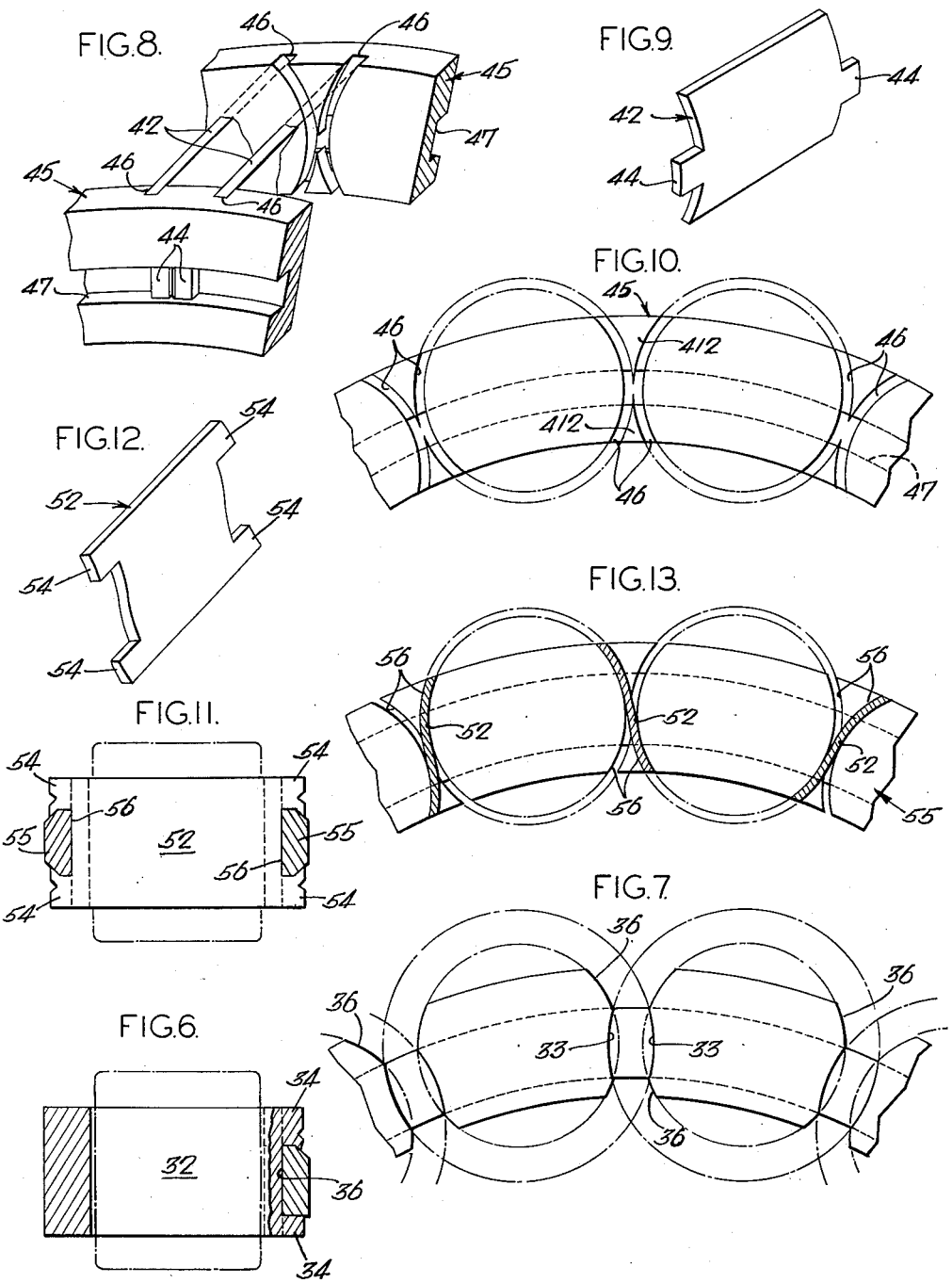

INVENTORS:
KARL EVALD ANDREAS GÖTHBERG
SVEN ERIK MALMSTRÖM
BY Howson & Howson
ATTYS.

United States Patent Office 3,057,667
Patented Oct. 9, 1962

3,057,667
CAGE FOR CYLINDRICAL ROLLER BEARINGS
Karl Evald Andreas Göthberg, Backasen, Lerum, and Sven-Erik Malmström, Goteborg, Sweden, assignors to Aktiebolaget Svenska Kullagerfabriken, Goteborg, Sweden, a corporation of Sweden
Filed Feb. 25, 1960, Ser. No. 10,923
Claims priority, application Sweden Mar. 6, 1959
6 Claims. (Cl. 308—217)

The present invention relates to a cage for cylindrical roller bearings and comprises a pair of side rings and a plurality of axially directed roller separating members interconnecting the said side rings. Many different forms of such cages are known, for example, cages in which the various parts are held together by means of rivets passing through the separating members and cages in which the separating members are provided with integral round pins for riveting them to a side ring. Both of these main types of cage have certain disadvantages. The separating members have a tendency to turn about the rivets or pins, respectively. Further, a cage of this type is not as resistant to torsional stresses as desired, with the reult that the rollers may assume a skewed position on their races. In the first-mentioned type of cage, also, the separating members must be comparatively thick to provide space for the rivets, and it is not suitable for bearings having comparatively long rollers because of the difficulty of drilling long, fine rivet holes through the separating members. Cages of this general type are also known in which the side rings and the separating members are made of sheet metal. Holes are provided in the side rings to fit pins on the flat separating members. A cage of this kind lacks to a still higher degree the necessary stability, particularly with respect to torsional stresses.

The present invention, which has for its purpose to eliminate the above-mentioned disadvantages, relates to a cage of the above mentioned type in which the separating members are provided with rivetable portions fitting into holes in at least one of the side rings. At least two of the surfaces of the said rivetable portions are direct continuations of the surfaces of the respective separating member. The cage is characterized thereby that generally radially directed curviform grooves are provided in one or both of said rings for each separating member into which grooves the separating member fits, and which grooves, at least at their inner and outer portions, fit snugly to the respective separating members.

The invention is explained in connection wtih the accompanying drawings in which:

FIG. 1 is a fragmentary perspective view, showing an embodiment of a cage for roller bearings constructed in accordance with the present invention;

FIG. 2 is a sectional view taken on line 2—2 of FIG. 1;

FIG. 3 is a fragmentary perspective view of a separating member of the embodiment of FIG. 1;

FIG. 4 is a fragmentary side elevational view of one of the side rings of the cage of FIG. 1;

FIG. 5 is a fragmentary perspective view of another embodiment of separating member and side ring in accordance with the present invention;

FIG. 6 is a sectional view showing the assembled separating member and side ring of the embodiment of FIG. 5;

FIG. 7 is a fragmentary side elevational view of one of the side rings of FIG. 5;

FIG. 8 is a fragmentary perspective view of another embodiment of cage construction in accordance with the present invention;

FIG. 9 is a perspective view of the separating member of the embodiment of FIG. 8;

FIG. 10 is a fragmentary side elevational view of one of the side rings of FIG. 8;

FIG. 11 is a sectional view of another embodiment of the cage in accordance with the present invention;

FIG. 12 is a perspective view of the separating member of the embodiment of FIG. 11;

FIG. 13 is a fragmentary side elevational view of the side ring of the embodiment of FIG. 11;

Figure 14:
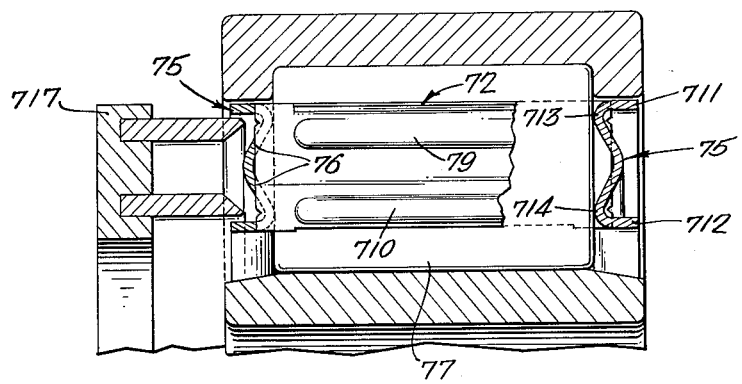
FIG. 14 is a sectional view of still another embodiment of cage in accordance with the present invention.

The cage illustrated in FIGS. 1, 2, 3 and 4 consists of two parts of which the part 21 is an annulus having axially directed separating members 22 which form pockets for the rollers 28 of which one is shown in chain lines in FIG. 2. The roller pockets are formed by a drilling or milling operation. The surfaces 23 of the separating members 22 adjacent the rollers 28 are thus cylindrical. The surfaces 23 are extended to form two surfaces of pins 24 integral with the separating members which, together with the ends of the separating members, fit exactly to two surfaces, respectively, of each of two grooves 26 and 27 formed in the respective sides of a solid ring 25 which forms the other side of the cage. The grooves 26 are milled with a hollow end milling cutter as shown diagrammatically in FIG. 4, in which the chain lines 29 and 210 indicate the inner and outer contours of the cutter. The inner contour 29 has the same radius as the surfaces 23 of the separating members. The annular groove 27 is machined in the opposed side of the side ring 25 to such a depth that it meets the grooves 26, thus forming openings 30. The width of the groove 27 is equal to the radial dimension of the pins 24.

The pins 24 are riveted over a bevelled surface 213 on the outside of the ring 25 as shown in FIG. 2. This riveting is suitably accomplished by means of an annular tool, similar to that shown in FIG. 14, which rivets all of the pins simultaneously.

The form of separating member shown in FIGS. 5, 6 and 7 differs from that described above only therein that there are two pins 34 on the separating member 32 which fit into two annular recesses in the opposite side of the ring, instead of the single groove 27. One of these pins may be dispensed with, without unduly weakening the cage since the ends of the separating members are embraced on two sides by the sides of the grooves 36.

The cage in FIGS. 8, 9 and 10 comprises two similar rings 45 between which a pair of separating members for each roller is inserted, the said separating members partially embracing the roller. The separating members 42 are preferably stamped from sheet metal and pressed to a cylindrical shape. The grooves 46 for the ends of the separating members are milled out of the rings 45 by means of a hollow-end milling cutter, the inner and outer radii of which are the same as those for the separating members as shown in FIG. 10, and another annular groove 47 is machined in the opposite surface of the ring to a depth such that it cuts through the ring until it meets the grooves 46, thus forming holes through the ring. These holes fit the pins 44 which are riveted over the outside of the rings 45.

FIG. 12 shows a form of a separating member 52, the cross-section of which is S-shaped and the ends 54 of which fit into grooves 56 in the rings 55. The manner of making these grooves is explained in connection with FIGS. 4, 7, 10 and 13, below.

An important part of the invention relates to the manner of forming the grooves 26, 36, 46 and 56. As mentioned above, they are made with a hollow-end milling cutter, the axis of rotation of which coincides with the axis of the roller. If, as shown in FIG. 4, the distance between the rollers is comparatively great and the width of the groove is less than, or equal to the least thickness of the separating member, two adjacent contours 210 may intersect at points outside of the outer circumference 211 of the ring 25 and inside its inner circumference, respectively. If one of the points of intersection, or both of them are inside of this surface as shown in FIG. 10, there will remain either one or two triangular portions 412 which must be removed if the separating members are of the type shown in FIGS. 3 and 5, but which is not necessary in the cages shown in FIGS. 10 and 13. If these portions are small they may be removed most conveniently by a turning operation, or in other cases by a milling operation. In FIG. 13 the grooves have the same breadth as the separating member 52 of FIG. 12, and two adjacent grooves overlap to an extent equal to the width of a groove. The S-shaped separating member will then fit into the S-shaped groove thus formed. In this form of the invention every other separating member may be turned in one direction and every other one in the opposite direction as shown in FIG. 13 in order to increase the capability of the cage to resist torsional stresses.

FIG. 7 shows a cage ring in which the points of intersection of the outer peripheries of the grooves 36 is located outside of the outer periphery of the ring. The width of the grooves is, however, greater than the waist of the separating member 32. The separating member will then not contact the walls of the groove along the whole surface 33, but only at the pins 34, i.e. at the inner and outer portions, respectively, of the separating member. This will not entail any considerable lessening of the strength of the cage.

Figure 15:
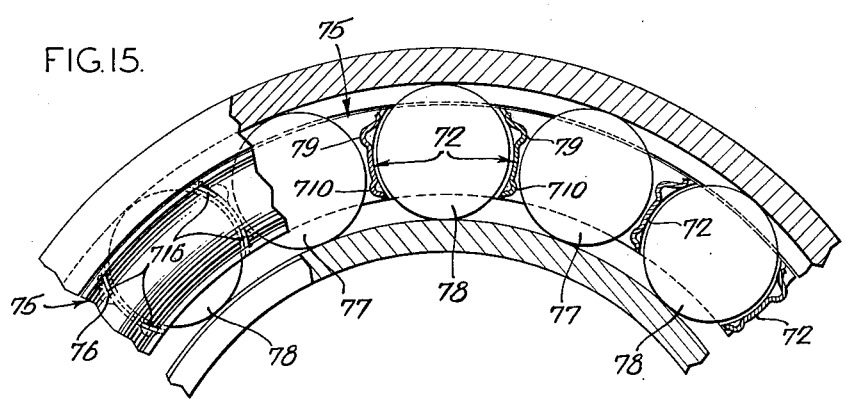
FIG. 15 is a fragmentary side elevational view, partly in section, of the cage of FIG. 14.
Figure 16:
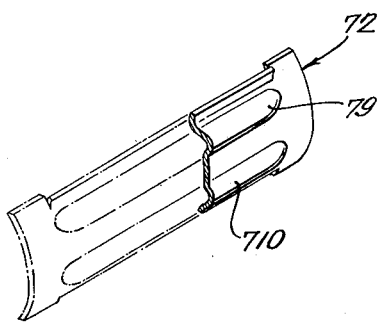
FIG. 16 is a fragmentary perspective view of the separating member for the cage of FIG. 14.

The form of the invention illustrated in FIGS. 14, 15 and 16 differs from the above-described forms mainly therein that not only the separating members 72 but also the side rings 75 are made of sheet metal. Grooves 76 are provided only for alternate rollers 78, for which reason the bearing is preferably provided with an even number of rollers. The shortest distance between each pair of adjacent rollers 77 and 78 will usually be greater than the thickness of the sheet metal. In order to fill out the space between the rollers, the separating members are provided with ridges 79 and 710. These ridges also serve to retain those of the rollers 77 which are not embraced by the separating members in place in the cage. The concave reverse sides of the ridges form pockets for lubricant. The side rings are provided with a pair of flanges 711 and 712 which serve to stiffen the rings and center the cage on the flanges of either of the race rings, although the cage may alternatively be centered on the rollers themselves. The annular portion of the side rings connecting the flanges 711 and 712 is provided with a pair of annular ridges 713 and 714 the height of which is about twice the thickness of the sheet metal. The grooves 76 are milled to a depth level with the bottom of the annular trough between the annular ridges 713 and 714 so that the metal is pierced to form holes 716.

The cage is assembled in the following manner: All of the separating members 72 are mounted in their grooves 76 in one of the side rings, and are riveted at the reverse side by means of an annular riveting tool 717. The rollers are then placed in position in (or on) the flanged race ring of the bearing and the above-mentioned cage portion is applied to the bearing by inserting the separating members 72 axially between the rollers 77, 78 after which the other side ring is applied to the cage and riveted in the manner described above. The bearing ring, the cage and the rollers will then form a self-contained unit.

In addition to the advantages already mentioned, the cage according to the present invention has the further advantage that the separating members may be made very thin, especially as shown in FIGS. 9 and 12, but the separating members of FIG. 7 may also be made thin without unduly weakening the cage itself.

A cage according to the invention may be centered in various ways; for instance in the outer race ring or on the inner race ring of the bearing or alternatively on the rollers. Further, the separating members may be made so that the rollers can be snapped into the pockets of the cage, which in this case may be assembled before being inserted in the bearing.

The cage according to FIGS. 1 to 7 is especially useful in precision bearing applications, at very high speeds and in bearings subjected to jolting as in motors for rail vehicles.

While particular embodiments of the present invention have been illustrated and described herein, it is to be understood that changes and modifications may be incorporated within the scope of the following claims.

We claim:

1. A roller cage for cylindrical roller bearings, comprising, spaced annular side rings, a plurality of circumferentially-spaced, axially-extending roller separating members disposed between said rings, means defining a plurality of generally radially extending curviform grooves on the inner side face of at least one of said rings, means defining at least one annular recess in the outer side face of said one ring which intersects said radially-extending grooves on the inner side face of said ring to define a plurality of axially-extending, circumferentially-spaced openings, each of said separating members adapted to be engaged and supported in said grooves, means on each of said separating members having a portion thereof to be engaged in said openings, said portion having at least two surfaces being direct continuations of surfaces of the respective separating members and said portion being deformable to secure said separating member in said opening in said one ring.

2. A roller cage according to claim 1 wherein the separating members are of sheet metal.

3. A roller cage according to claim 2, wherein the separating members have an S-shaped cross-section.

4. A cage according to claim 1 wherein the separating members have the form of a right-angled segment of a cylinder, the radius of curvature of the concave surface thereof being slightly larger than the radius of the rollers.

5. A roller cage for cylindrical roller bearings, comprising, spaced annular side rings, said side rings being of sheet metal and having a pair of annular ridges facing the interior of the bearing and located at the outer and inner portions of the ring, respectively, the height of said ridges being greater than the thickness of the sheet metal, a plurality of circumferentially-spaced, axially-extending roller separating members disposed between said side rings and being of constant section between said side rings, means defining a plurality of generally radially-extending curviform grooves on the inner peripheral surface of at least one of said rings, each of said separating members adapted to be engaged and supported in said grooves, means defining circumferentially-spaced openings in at least one of said rings cooperatively disposed in alignment with said separating members, and means on each of said separating members having a portion thereof to be engaged in said openings, said portion having at least two surfaces being direct continuations of surfaces of the respective separating members and said portions further being deformable to secure said separating member in said opening and to said side ring.

6. A roller cage for cylindrical roller bearings, comprising, spaced annular side rings, a plurality of circumferentially-spaced, axially-extending roller separating members disposed between said side rings and being of constant section between said side rings, alternate rollers being each embraced by a pair of opposed separating members having ridges for retaining other rollers in the cage, means defining a plurality of generally radially-extending curviform grooves on the inner peripheral surface of at least one of said rings, each of said separating members adapted to be engaged and supported in said grooves, means defining circumferentially-spaced openings in at least one of said rings cooperatively disposed in alignment with said separating members, and means on each of said separating members having a portion thereof to be engaged in said openings, said portion having at least two surfaces being direct continuations of surfaces of the respective separating members, said portions further being deformable to secure said separating member in said opening and to said side ring.

References Cited in the file of this patent

UNITED STATES PATENTS 2,483,695  Edwards _____ Oct. 4, 1949

FOREIGN PATENTS 187,718  Great Britain _____ Oct. 25, 1922